(12) United States Patent
Kuromizu (10) Patent No.: US 8,827,478 B2
(45) Date of Patent: Sep. 9, 2014

(54) LIGHTING DEVICE, DISPLAY DEVICE, AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 288 days.

(21) Appl. No.: 13/502,811

(22) PCT Filed: Jun. 16, 2010

(86) PCT No.: PCT/JP2010/060175
§ 371 (c)(1),
(2), (4) Date: Apr. 19, 2012

(87) PCT Pub. No.: WO2011/055565
PCT Pub. Date: May 12, 2011

(65) Prior Publication Data
US 2012/0212682 A1     Aug. 23, 2012

(30) Foreign Application Priority Data

Nov. 6, 2009   (JP) ................. 2009-254571

(51) Int. Cl.
*G09F 13/04* (2006.01)
*G09F 13/08* (2006.01)
*G02F 1/1335* (2006.01)
*G02B 19/00* (2006.01)
*G02B 3/08* (2006.01)

(52) U.S. Cl.
CPC .... *G02F 1/133603* (2013.01); *G02F 1/133605* (2013.01); *G02B 19/0061* (2013.01); *G02F 1/133606* (2013.01); *G02B 3/08* (2013.01); *G02B 19/0028* (2013.01); *G02B 19/0095* (2013.01)
USPC ........................... 362/97.1; 362/97.3; 349/64

(58) Field of Classification Search
CPC .................... G02F 1/133604; G02F 1/133603; G02F 1/133602; G02F 1/133608
USPC ........ 349/64, 67, 612; 40/546, 582, 549, 573; 362/97.1, 97.2, 97.3, 296.04, 612; 348/739
See application file for complete search history.

(56) References Cited

U.S. PATENT DOCUMENTS

| 4,929,866 A   | 5/1990 | Murata et al. |
| 6,278,135 B1* | 8/2001 | Srivastava et al. .............. 257/98 |

(Continued)

FOREIGN PATENT DOCUMENTS

| JP | 1-251502 A | 10/1989 |
| JP | 5-89703 A  | 4/1993  |

(Continued)

OTHER PUBLICATIONS

Official Communication issued in International Patent Application No. PCT/JP2010/060175, mailed on Sep. 14, 2010.

*Primary Examiner* — Nimeshkumar Patel
*Assistant Examiner* — Glenn Zimmerman
(74) *Attorney, Agent, or Firm* — Keating & Bennett, LLP (57) ABSTRACT

A backlight unit which is a lighting device is provided with: a diffusion plate; a chassis having rising sections which are provided at the outer periphery of the main flat surface thereof and supporting the diffusion plate; light-emitting modules disposed at the main flat surface and the rising sections of the chassis and applying light to the diffusion plate; and reflecting sheets disposed at the main flat surface and the rising sections of the chassis and reflecting the light, which is emitted from the light-emitting modules, toward the diffusion plate. The reflecting sheets have formed thereon sloped sections for reflecting, toward the diffusion plate, the light emitted from the light-emitting modules disposed at the rising sections.

32 Claims, 11 Drawing Sheets

(56) References Cited

U.S. PATENT DOCUMENTS

| | | | |
|---|---|---|---|
| 8,052,315 B2* | 11/2011 | Iwasaki | 362/609 |
| 8,162,499 B2* | 4/2012 | Nakanishi | 362/97.1 |
| 8,657,480 B2* | 2/2014 | Lee et al. | 362/625 |
| 2003/0160256 A1* | 8/2003 | Durocher et al. | 257/88 |
| 2005/0265051 A1 | 12/2005 | Yamamoto et al. | |
| 2006/0220046 A1* | 10/2006 | Yu et al. | 257/98 |
| 2007/0012936 A1* | 1/2007 | Zeng et al. | 257/98 |
| 2007/0064171 A1* | 3/2007 | Moriyasu et al. | 349/61 |
| 2007/0115660 A1* | 5/2007 | Lee et al. | 362/240 |
| 2007/0215890 A1* | 9/2007 | Harbers et al. | 257/98 |
| 2008/0047181 A1 | 2/2008 | Sakai | |
| 2008/0048193 A1* | 2/2008 | Yoo et al. | 257/89 |
| 2008/0150884 A1 | 6/2008 | Ito | |
| 2009/0116245 A1 | 5/2009 | Yamaguchi | |
| 2009/0268125 A1* | 10/2009 | Kamada et al. | 349/62 |
| 2010/0118509 A1* | 5/2010 | Kwon et al. | 362/84 |
| 2010/0134711 A1* | 6/2010 | Park | 349/58 |

FOREIGN PATENT DOCUMENTS

| | | |
|---|---|---|
| JP | 9-259627 A | 10/1997 |
| JP | 2003-330424 A | 11/2003 |
| JP | 3105002 U | 10/2004 |
| JP | 2005-19065 A | 1/2005 |
| JP | 2005-339881 A | 12/2005 |
| JP | 2006-30423 A | 2/2006 |
| JP | 2006-189665 A | 7/2006 |
| JP | 2008-41546 A | 2/2008 |
| JP | 2008-152101 A | 7/2008 |
| JP | 2008-158449 A | 7/2008 |
| JP | 2009-117207 A | 5/2009 |
| JP | 2009-187904 A | 8/2009 |
| WO | 2006/003913 A1 | 1/2006 |
| WO | 2007/037048 A1 | 4/2007 |
| WO | WO 2007037048 A1 * | 4/2007 |
| WO | WO 2008023893 A1 * | 2/2008 |

* cited by examiner

LIGHTING DEVICE, DISPLAY DEVICE, AND TELEVISION RECEIVER

TECHNICAL FIELD

The present invention relates to a lighting device, a display device including the lighting device, and a television receiver including the display device.

BACKGROUND ART

A display device using a non-self-luminous display panel such as, for example, a liquid crystal display panel is used typically in combination with a lighting device that illuminates the display panel from behind. A lighting device of this type uses any of various types of light sources including a cold cathode tube, a light emitting element, and the like. Examples of a light emitting element include a light emitting diode (hereinafter, referred to as an "LED"), an organic electroluminescent element, an inorganic electroluminescent element, and the like, among which the most commonly used today is an LED. A lighting device described in Patent Document 1 also uses an LED as a light source.

Figure 8:
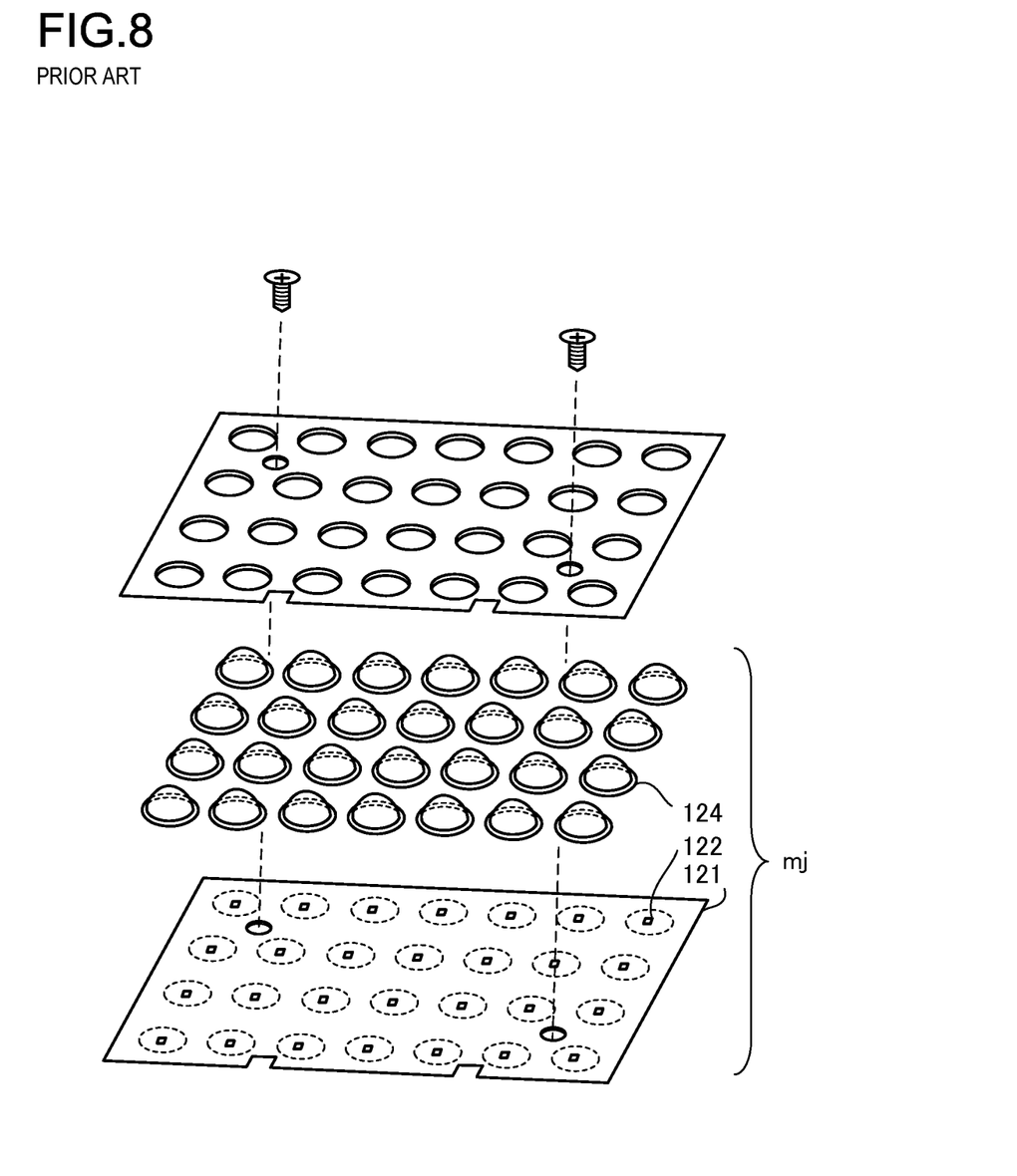
FIG. 8 is an exploded perspective view of a conventional lighting device.

In the lighting device described in Patent Document 1, as shown in FIG. 8, LEDs 122 are mounted on a mounting substrate 121, and a lens 124 that covers each of the LEDs 122 is mounted to the mounting substrate 121. The mounting substrate 121, each of the LEDs 122, and the lens 124 constitute a light emitting module mj. A multitude of the light emitting modules mj are disposed in a matrix form to form a planar light source.

While in the lighting device described in Patent Document 1, a multitude of point light sources are arranged, in a lighting device described in Patent Document 2, a multitude of linear light sources such as cold cathode tubes are arranged. In a case where a display device is used in combination with a lighting device in which a plurality of light sources are arranged in this manner, light from the light sources directly entering the lighting device leads to unevenness in brightness on a screen, and hence, in order to prevent this, a diffusion plate that diffuses light is disposed between the light sources and the display device. As is also the case with Patent Document 2, a diffusion plate is generally used as a constituent component of a lighting device.

The light sources in a state of being mounted on a mounting substrate are assembled to a chassis of the lighting device. A mounting substrate, from which not much can be expected in terms of light reflection, is typically covered with a reflection sheet so that only light sources are exposed therefrom. An example of such a lighting device including a reflection sheet can be found in Patent Document 3.

Even in a case where a diffusion plate and a reflection sheet are used, the luminance on the diffusion plate is decreased at an outer peripheral portion thereof compared with that at a center portion thereof. In Patent Document 4, such a decrease in luminance at an outer peripheral portion is compensated for by disposing LEDs that are linearly mounted on an inner wall of a chassis.

LIST OF CITATIONS

Patent Literature

Patent Document 1: JP-A-2008-41546
Patent Document 2: JP-A-2005-19065
Patent Document 3: JP-A-2008-152101
Patent Document 4: JP-A-2006-189665

SUMMARY OF THE INVENTION

Technical Problem

In a case where the above-described light emitting module mj is used, from the viewpoints of wiring and heat radiation on the mounting substrate 121, there is a limitation on the number of the LEDs 122 that can be disposed on the mounting substrate 121. As a result, in forming a planar light source by arranging a multitude of the LEDs 122, an achievable mounting density of the LEDs 122 is limited, and an achievable luminance level is also limited.

Figure 9:
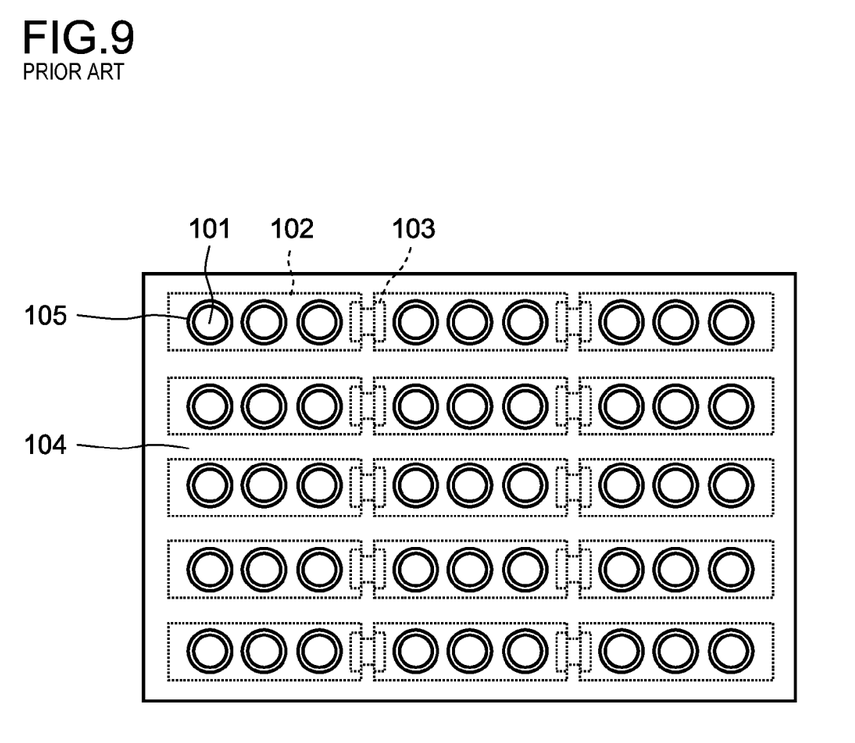
FIG. 9 is a plan view showing a configuration example of the lighting device.

Furthermore, when an increased area needs to be illuminated, a configuration may be required in which a plurality of mounting substrates each supporting a plurality of point light sources are arranged, and each pair of adjacent ones of the mounting substrates are connected to each other with a connector. FIG. 9 shows an example of this configuration. In a configuration shown in FIG. 9, three rectangular strip-shaped mounting substrates 102, on each of which three point light sources 101 are disposed along a longitudinal direction, are arranged in series so as to be aligned in the longitudinal direction, and each pair of adjacent ones of the mounting substrates 102 are electrically connected to each other via a connector 103. With respect to a combination of these three mounting substrates 102 as one set, five sets of these are disposed side by side, so that 45 point light sources 101 in total are disposed in a matrix form. All of these mounting substrates 102 are covered with a reflection sheet 104. Through holes 105 for exposing the point light sources 101 are formed through the reflection sheet 104 so as to correspond in number to the point light sources 101.

In this case, a decrease in luminance occurs in an area occupied by the connector 103 and in an area corresponding to a gap between each pair of adjacent ones of the mounting substrates 101. A local decrease in luminance on a diffusion plate impairs illumination quality, and it is, therefore, required to achieve a uniform luminance.

It is an object of the present invention to provide a lighting device that achieves an improvement in luminance and can efficiently increase the luminance in a particular region. It is another object of the present invention to provide a display device including the lighting device and a television receiver including the display device.

Solution to the Problem

In order to achieve the above-described objects, a lighting device of the present invention includes: a diffusion plate; a chassis that has a raised portion on an outer periphery of a main flat surface thereof and supports the diffusion plate; a light source that is disposed on each of the main flat surface and the raised portion of the chassis and irradiates the diffusion plate with light; and a reflection sheet that is disposed on the main flat surface of the chassis and reflects light emitted by the light source toward the diffusion plate.

According to this configuration, light from the light source disposed on the raised portion eventually enters the diffusion plate.

In the above-described lighting device, preferably, the light source disposed on the raised portion is disposed so as to be inclined toward the reflection sheet in order to emit light toward the reflection sheet.

Furthermore, in the above-described lighting device, the light source disposed on the raised portion may be disposed so as to be inclined toward the diffusion plate in order to emit light toward the diffusion plate.

Furthermore, in the above-described lighting device, preferably, the light source disposed on the raised portion is disposed so as to be oriented to a center side of the main flat surface of the chassis in order to focus light to the center side of the main flat surface of the chassis.

Furthermore, in the above-described lighting device, preferably, on the reflection sheet, an inclined portion is formed that reflects light emitted by the light source disposed on the raised portion toward the diffusion plate.

Furthermore, in the above-described lighting device, preferably, the inclined portion has a substantially triangular cross section.

Furthermore, in the above-described lighting device, preferably, the inclined portion has a dome-shaped cross section.

Furthermore, in the above-described lighting device, preferably, the inclined portion has a substantially trapezoidal cross section.

Furthermore, in the above-described lighting device, preferably, a cut-and-raised piece formed by making a cut in the reflection sheet and by raising a resulting cut portion of the reflection sheet toward the diffusion plate constitutes the inclined portion.

Furthermore, in the above-described lighting device, preferably, the cut made in the reflection sheet is of an H-shape.

Furthermore, in the above-described lighting device, preferably, the cut made in the reflection sheet is of an X-shape.

Furthermore, in the above-described lighting device, preferably, the cut made in the reflection sheet is of such a shape as to form the cut-and-raised piece in an L-shape.

Furthermore, in the above-described lighting device, preferably, the cut made in the reflection sheet is of such a shape as to form the cut-and-raised piece in a concave shape.

Furthermore, in the above-described lighting device, preferably, the cut made in the reflection sheet is of such a shape as to form the cut-and-raised piece in a convex shape.

Furthermore, in the above-described lighting device, preferably, the cut made in the reflection sheet is of such a shape as to form the cut-and-raised piece in a triangular shape.

Furthermore, in the above-described lighting device, preferably, the cut made in the reflection sheet is of such a shape as to form the cut-and-raised piece in a quadrangular shape.

Furthermore, in the above-described lighting device, preferably, the cut made in the reflection sheet is of such a shape as to form the cut-and-raised piece in a claw shape.

Furthermore, in the above-described lighting device, preferably, the cut made in the reflection sheet is of the shape of a straight line.

Furthermore, in the above-described lighting device, preferably, the cut made in the reflection sheet is of the shape of a curve.

Furthermore, in the above-described lighting device, preferably, the light source is constituted by a light emitting module including a mounting substrate and a light emitting element disposed on the mounting substrate.

Furthermore, in the above-described lighting device, preferably, a plurality of light emitting elements are disposed side by side on the mounting substrate.

Furthermore, in the above-described lighting device, preferably, the light emitting element is an LED.

According to this configuration, an LED of recent years that has been remarkably improved in luminance is used, and thus a lighting device that provides high brightness can be obtained.

Furthermore, in the above-described lighting device, preferably, the LED is obtained by applying a phosphor having a light emission peak in a yellow region to a blue light emitting chip to gain white light.

Furthermore, in the above-described lighting device, preferably, the LED is obtained by applying phosphors having light emission peaks in green and red regions, respectively, to a blue light emitting chip to gain white light.

Furthermore, in the above-described lighting device, preferably, the LED is obtained by applying a phosphor having a light emission peak in a green region to a blue light emitting chip and by using the blue light emitting chip in combination with a red light emitting chip to gain white light.

Furthermore, in the above-described lighting device, preferably, the LED is obtained by using, in combination, light emitting chips of respective colors of blue, green, and red to gain white light.

Furthermore, in the above-described lighting device, preferably, the LED is obtained by using an ultraviolet light chip in combination with a phosphor.

Furthermore, in the above-described lighting device, preferably, the LED is obtained by applying phosphors having light emission peaks in blue, green, and red regions, respectively, to an ultraviolet light chip to gain white light.

In a case where an ultraviolet light chip is used as a light source, resulting light is likely to vary in color tone. According to the configuration of the present invention, however, resulting light has a color tone leveled as a whole, and thus illumination light with a substantially uniform color tone can be obtained.

Furthermore, in the above-described lighting device, preferably, in the light emitting module, on an opposite side to the side of the chassis, a diffusion lens that diffuses light from the light emitting element is disposed at a position coinciding with the light emitting element when seen in a plan view.

Furthermore, in the above-described lighting device, preferably, a plurality of the mounting substrates are disposed, and each pair of adjacent ones of the mounting substrates are connected to each other with a connector.

According to this configuration, with a plurality of types of mounting substrates different in size prepared in advance, even in a case of forming the lighting device in a different size, such a size change can be easily made by changing a combination of the types of mounting substrates to be connected to each other with the connector. This eliminates the need to design mounting substrates dedicated to lighting devices different in size, respectively, and thus contributes to cost reduction.

Furthermore, in the above-described lighting device, preferably, the mounting substrates are connected to a power source via the connector.

Furthermore, a display device of the present invention includes the above-described lighting device and a display panel that receives light from the lighting device.

According to this configuration, a display device that suppresses the occurrence of unevenness in luminance can be obtained.

In the above-described display device, preferably, the display panel is a liquid crystal display panel.

According to this configuration, a liquid crystal display device that suppresses the occurrence of unevenness in luminance can be obtained.

Furthermore, a television receiver of the present invention includes the above-described display device.

According to this configuration, a television receiver that suppresses the occurrence of unevenness in luminance of a screen can be obtained.

Advantageous Effects of the Invention

According to the present invention, light from the light source disposed on the raised portion is guided to a particular region, and this achieves an improvement in luminance and can efficiently increase the luminance in the particular region.

DESCRIPTION OF EMBODIMENTS

Figure 1:
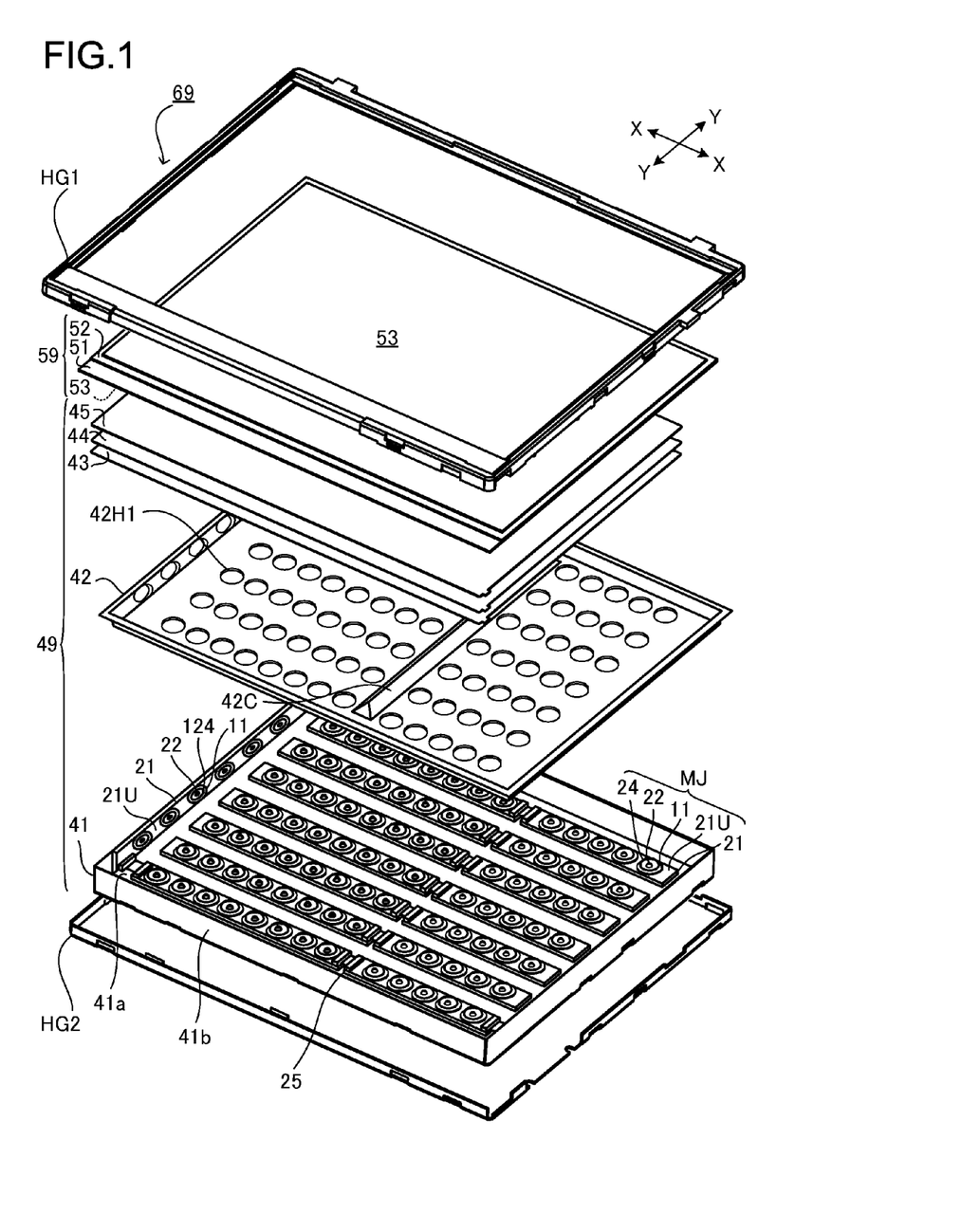
FIG. 1 is an exploded perspective view of a display device including a lighting device according to the present invention.
Figure 2:
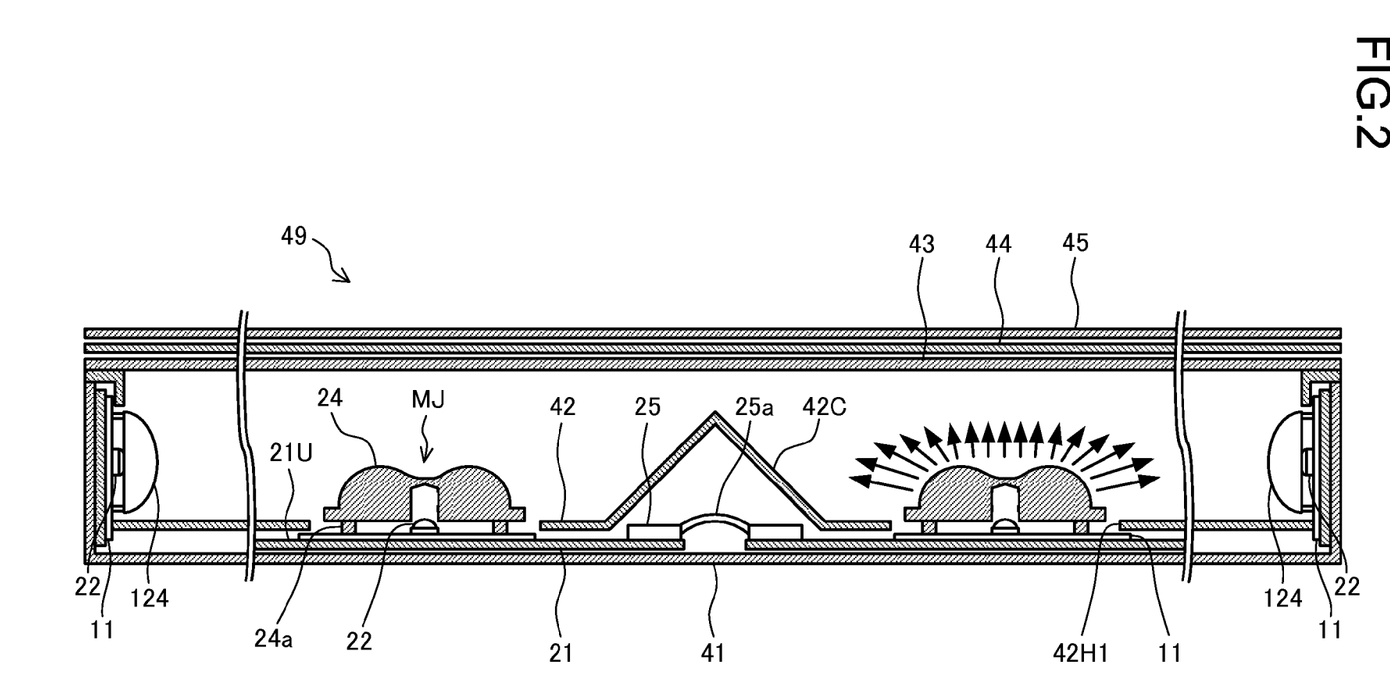
FIG. 2 is a partial sectional view of the lighting device.
Figure 3:
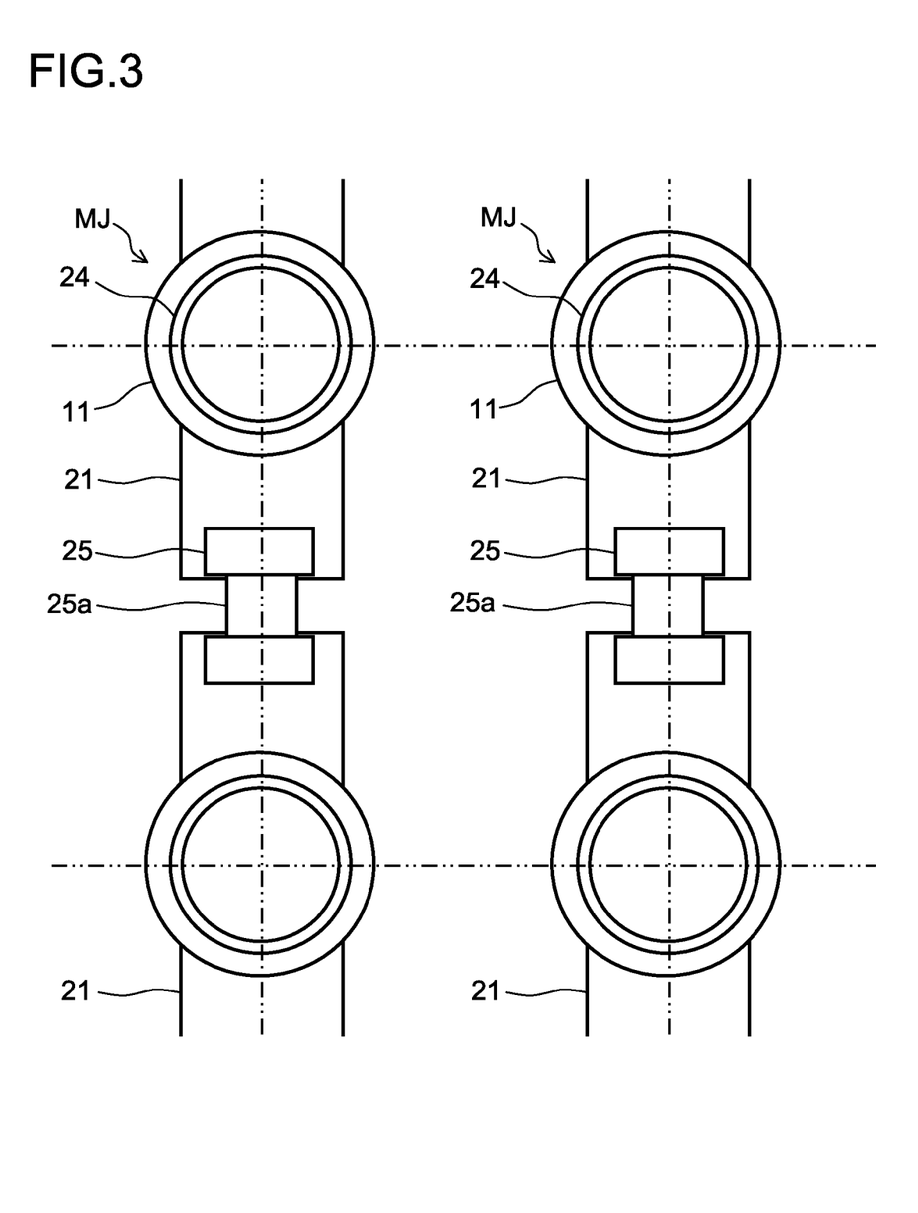
FIG. 3 is a partial plan view of the lighting device shown in FIG. 2.

Based on FIGS. 1 to 3, the following describes a structure of an embodiment of a display device including a lighting device according to the present invention. In FIG. 1, a display device 69 is depicted as being placed horizontally with its display surface facing upward.

The display device 69 uses a liquid crystal display panel 59 as a display panel. The liquid crystal display panel 59 and a backlight unit 49 that illuminates the liquid crystal display panel 59 from behind are housed in a single housing. The housing is formed by joining a front housing member HG1 and a rear housing member HG2 together.

The liquid crystal display panel 59 is formed by laminating together, via an unshown sealing material, an active matrix substrate 51 including a switching element such as a thin film transistor (TFT) or the like and an opposed substrate 52 opposed to the active matrix substrate 51 and by filling a space between the active matrix substrate 51 and the opposed substrate 52 with liquid crystal.

A polarization film 53 is attached to each of a light receiving surface side of the active matrix substrate 51 and a light output side of the opposed substrate 52. The liquid crystal display panel 59 forms images by utilizing variations in light transmittance attributable to a tilt of liquid crystal molecules.

The backlight unit 49 embodying the lighting device according to the present invention has the following configuration. That is, the backlight unit 49 includes a light emitting module MJ, a chassis 41, a large-sized reflection sheet 42, a diffusion plate 43, a prism sheet 44, and a microlens sheet 45.

The chassis 41 is shaped like a tray, having a rectangular main flat surface 41a with a raised portion 41b formed on an outer periphery thereof.

The light emitting module MJ includes a mounting substrate 21, point light sources disposed, for example, side by side on the mounting substrate 21, a lens 24 that covers each of the point light sources, and an embedded reflection sheet 11. Each of the point light sources is constituted by a light emitting element mounted on the mounting substrate 21. In this embodiment, an LED 22 is used as the light emitting element.

The lens 24 has a light diffusing function. The significance of the light diffusing function of the lens 24 is described below. Taking the lighting device described in Patent Document 1 as an example, in the lighting device shown in FIG. 8, even though used in combination with the lens 124, each of the individual LEDs 122 is small in degree of divergence of light emitted thereby. Because of this, in order to eliminate unevenness in luminance, it is required that a large number of the light emitting modules mj be disposed at high density. This leads to an increase in component and mounting costs, rendering the device as a whole costly.

LEDs of recent years have been increasingly improved in luminance, thereby making it possible to obtain an amount of light required to illuminate the entire surface of a screen by using a relatively small number of LEDs. Sparsely disposing high-luminance LEDs, however, inevitably causes unevenness in luminance, and it is, therefore, preferable to use each individual LED in combination with a lens having the light diffusing function. In this specification, a lens having the light diffusing function is referred to as a "diffusion lens". In the light emitting module, on an opposite side to the side of the chassis, the diffusion lens is disposed at a position coinciding with the light emitting element when seen in a plan view.

Figure 10:
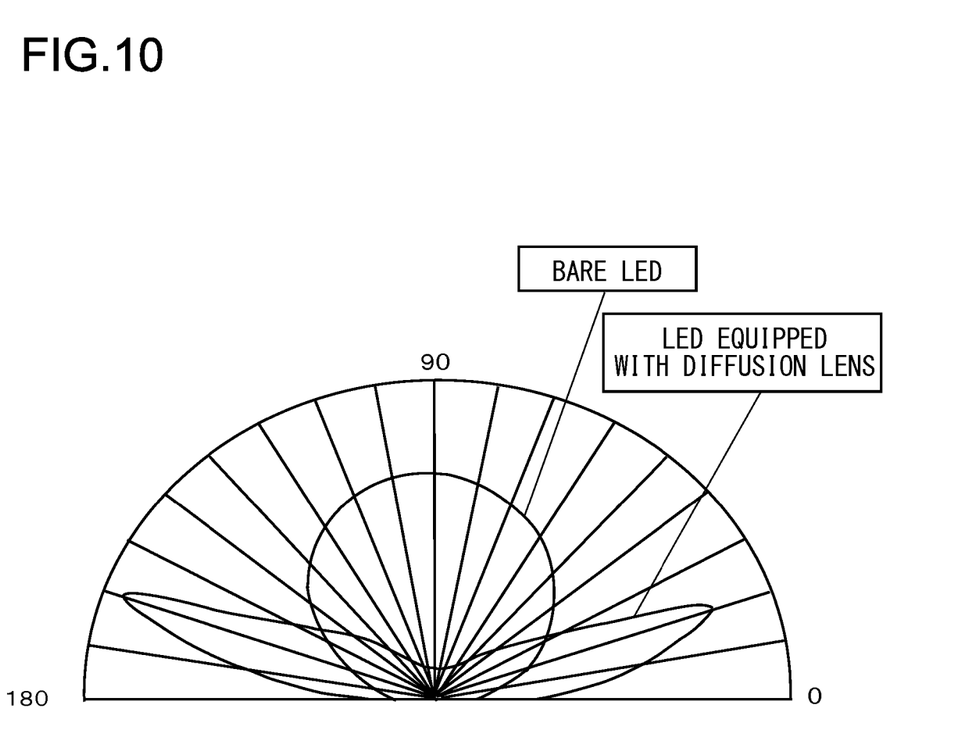
FIG. 10 is a graph showing how illuminance varies depending on an irradiation direction of an LED.

FIG. 10 is a graph showing how illuminance (unit: lux) varies depending on an irradiation direction of each of a bare LED and an LED equipped with a diffusion lens. In a case of the bare LED, the illuminance thereof reaches its peak at an angle of 90°, which is an optical axis angle, and decreases sharply with increasing angle deviation from 90°. On the other hand, in a case of the LED equipped with the diffusion lens, an illuminance value equal to or greater than a given value can be secured at a wider range of angles, and the illuminance thereof can be set to reach its peak at an angle different from the optical axis angle. Needless to say, an illuminance pattern shown in the figure may vary in various ways depending on how the diffusion lens is designed.

Figure 11:
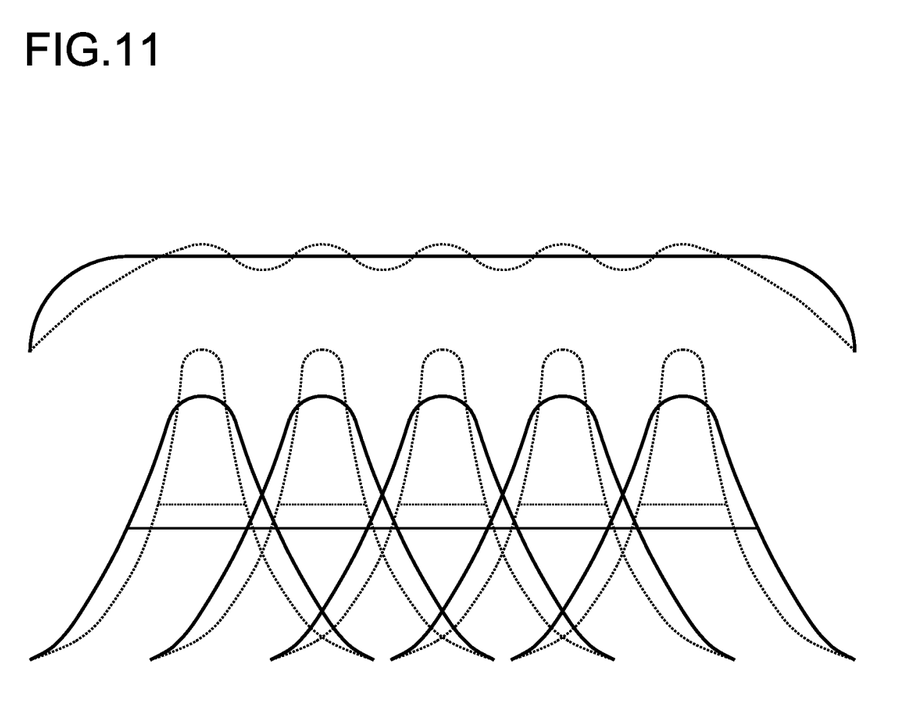
FIG. 11 is a conceptual view showing a collective luminance of a plurality of LEDs.

FIG. 11 shows a conceptual view of a collective luminance of a plurality of LEDs. In the figure, a waveform shown by a solid line indicates a luminance of an LED equipped with a diffusion lens, and a waveform shown by a dotted line indicates a luminance of a bare LED. A horizontal line drawn in a waveform indicates a width of the waveform at a luminance value half its peak value (full width at half maximum). In a case of the LEDs each equipped with the diffusion lens, each individual waveform having an increased width can be obtained, and thus a waveform representing their respective luminances in a collective form can be easily made flat as shown by the solid line on the upper side in the figure. On the other hand, in a case of the bare LEDs, each individual waveform obtained is large in height and small in width, so that a waveform representing their respective luminances in a collective form inevitably becomes uneven. An image having such unevenness in luminance is undesirable, and it is, therefore, substantially essential that an LED equipped with a diffusion lens be adopted.

In view of the above, at least the light emitting module MJ disposed on the main flat surface 41a of the chassis 41 is configured to include the diffusion lens 24. The light emitting module disposed on the raised portion 41b of the chassis 41 does not necessarily need a diffusion lens but may use one, in which case it is sufficient to use a diffusion lens that provides a small degree of light divergence such as the diffusion lens 124 shown in FIG. 8. This is because it is primarily intended that light emitted from the light emitting module disposed on the raised portion 41b is reflected off an after-mentioned inclined portion 42C of the reflection sheet 42.

It is also possible to impart the light diffusing function to the diffusion lens 24 by subjecting a surface of the diffusion lens 24 facing the mounting substrate 21 to a process of surface roughening such as graining. This enables a further increased degree of light diffusion.

The mounting substrate 21 has an elongated rectangular shape, and on a mounting surface 21U that is an upper surface of the mounting substrate 21, a plurality of electrodes (not shown) are formed in a line parallel to a longitudinal direction of the mounting substrate 21 at a predetermined spacing from each other, and the LED 22 is mounted on each of the electrodes. The mounting substrate 21 is used as a common substrate shared by a plurality of the LEDs 22. That is, as shown in FIG. 1, a plurality of the LEDs 22 are disposed in the line parallel to the longitudinal direction of the mounting substrate 21 at a predetermined spacing from each other, in this case, at a predetermined equal spacing from each other.

Since a plurality of the LEDs 22 are disposed on the mounting substrate 21 that has a shape having a longitudinal direction, and the mounting substrate 21 in that state is installed on the chassis 41, compared with a case where the LEDs 22 are installed on the chassis 41 one by one, work efficiency can be improved. Furthermore, since the plurality of the LEDs 22 are disposed in the line parallel to the longitudinal direction of the mounting substrate 21, how the LEDs 22 are installed is determined univocally depending on how the mounting substrate 21 is installed, and thus designing the disposition of the LEDs 22 is facilitated. Since the plurality of the LEDs 22 are disposed in the line at an equal spacing from each other, how the LEDs 22 are disposed does not vary depending on the type of the mounting substrate 21, and thus the mounting substrate 21 can be used even in a case where the backlight unit 49 is changed in size.

The diffusion lens 24 has a circular shape in a plan view and is provided with a plurality of leg portions 24a at a lower surface thereof. Each of the leg portions 24a is bonded at its tip end to the mounting surface 21U of the mounting substrate 21 by use of an adhesive, and thus the diffusion lens 24 is mounted to the mounting substrate 21. The presence of the leg portions 24a provides a gap between the mounting substrate 21 and the diffusion lens 24. An airflow flowing through this gap cools the LED 22. Provided that the problem of heat radiation can be solved, it is also possible to use a light emitting module of an integrally molded type obtained by embedding an LED in a diffusion lens.

Various types of LEDs can be used as the LED 22. For example, there can be used an LED of a type obtained by applying a phosphor having a light emission peak in a yellow region to a blue light emitting chip to gain white light. Also, there can be used an LED of a type obtained by applying phosphors having light emission peaks in green and red regions, respectively, to a blue light emitting chip to gain white light. Moreover, there can be used an LED of a type obtained by applying a phosphor having a light emission peak in a green region to a blue light emitting chip and by using the blue light emitting chip in combination with a red light emitting chip to gain white light. In addition, there can be used an LED of a type using, in combination, light emitting chips of respective colors of blue, green, and red to gain white light.

A white light emitting LED emits white light that is likely to vary in color tone due to, for example, a high degree of blueness. White light emitted based on any of the above-described configurations has a color tone leveled as a whole, and thus illumination light with a substantially uniform color tone can be obtained.

Other types of LEDs that can also be used include a type using an ultraviolet light chip in combination with a phosphor, particularly, a type obtained by applying phosphors having light emission peaks in blue, green, and red regions, respectively, to an ultraviolet light chip to gain white light.

In a case where an ultraviolet light chip is used as a light source, resulting light is likely to vary in color tone. With the above-described configuration, however, resulting light has a color tone leveled as a whole, and thus illumination light with a substantially uniform color tone can be obtained.

In FIG. 1, there are used in combination the mounting substrate 21 of a type on which five LEDs 22 per substrate are arranged, the mounting substrate 21 of a type on which eight LEDs 22 per substrate are arranged, and the mounting substrate 21 of a type on which six LEDs 22 per substrate are arranged. Electrical connection between the mounting substrate 21 of the type having five LEDs 22, the mounting substrate 21 of the type having eight LEDs 22, and the mounting substrate 21 of the type having six LEDs 22 is established by use of a connector 25. The connector 25 has a middle portion constituted by a wire harness 25a.

With respect to a combination of the mounting substrate 21 of the type having five LEDs 22 and the mounting substrate 21 of the type having eight LEDs 22 connected to each other with the connector 25 as one set, a plurality of sets of these are arranged in parallel with each other on the main flat surface 41a of the chassis 41. On each of these types of mounting substrates 21, the LEDs 22 are arranged in a direction of a long side of the chassis 41, namely, a direction indicated by an arrow X in FIG. 1, and the plurality of sets of these two types of mounting substrates 21 in combination are arranged in a direction of a short side of the chassis 41, namely, a direction indicated by an arrow Y in FIG. 1, so that the LEDs 22 are arranged in the form of a matrix. As indicated by an imaginary line in FIG. 3, each mesh of a grid pattern of the matrix is rectangular. The mounting substrates 21 of these types are fixed to the chassis 41 appropriately by, for example, swaging, bonding, screwing, or riveting.

The mounting substrate 21 of the type having six LEDs 22 is disposed on each of sides of the raised portion 41b at both ends of the chassis 41 in the X direction. On this type of mounting substrate 21, the LEDs 22 are arranged in the direction of the short side of the chassis 41, namely, the direction indicated by the arrow Y in FIG. 1. The mounting substrate 21 of this type is fixed to the chassis 41 appropriately by, for example, swaging, bonding, screwing, or riveting.

Disposing the LEDs 22 also on the raised portion 41b of the chassis 41 in the above-described manner can provide a higher luminance than in a case where the LEDs 22 are disposed only on the main flat surface 41a of the chassis 41.

Since a plurality of the mounting substrates 21 are installed on the chassis 41, and each pair of adjacent ones of the mounting substrates 21 are connected to each other with the connector 25, with a plurality of types of mounting substrates 21 different in size prepared in advance, even in a case of forming the backlight unit 49 in a different size, such a size change can be easily made by changing a combination of the types of mounting substrates 21 to be connected to each other with the connector 25. This eliminates the need to design mounting substrates 21 dedicated to backlight units 49 different in size, respectively, and thus contributes to cost reduction. Furthermore, since among the mounting substrates 21 disposed on the main flat surface 41a of the chassis 41, each pair aligned in the longitudinal direction constitute the above-described pair of adjacent ones of the mounting substrates 21, with a plurality of types of mounting substrates 21 different in length, i.e. in the number of the LEDs 22 disposed thereon prepared in advance, in a case of forming the backlight unit 49 in a different size, such a size change can be easily made.

The embedded reflection sheet 11 is disposed between the mounting substrate 21 and the diffusion lens 24. The embedded reflection sheet 11 is fixed at a position on the mounting surface 21U where the mounting surface 21U faces the lower surface of the diffusion lens 24. The embedded reflection sheet 11 has a light reflectance higher than that of the mounting substrate 21. The embedded reflection sheet 11 also has a circular shape in a plan view and is concentric with the diffusion lens 24. The diameter of the embedded reflection sheet 11 is larger than that of the diffusion lens 24. A through hole for passing therethrough each of the leg portions 24a of the diffusion lens 24 is formed through the embedded reflection sheet 11.

The reflection sheet 42 formed in a tray shape similar to that of the chassis 41 is laid on the chassis 41. As the reflection sheet 42, a foamed resin sheet of a type similar to the type used for the embedded reflection sheet 11 is used. A peripheral edge portion of the reflection sheet 42 overlies the mounting substrates 21 placed on the raised portion 41b of the chassis 41, and a main flat surface of the reflection sheet 42 on an inner side of the peripheral edge portion overlies the mounting substrates 21 placed on the main flat surface 41a of the chassis 41. The reflection sheet 42 is fixed to the mounting substrates 21 by use of a fastening member such as a resin pin, a resin rivet, a screw, or the like.

A circular pass-through opening 42H1 having a size sufficient for the diffusion lens 24 to pass therethrough but insufficient for the embedded reflection sheet 11 to pass therethrough is formed through the reflection sheet 42 so as to correspond to the position of each of the light emitting modules MJ.

On the reflection sheet 42, the inclined portion 42C is formed so as to correspond to the positions of the connectors 25. As shown in FIG. 2, the inclined portion 42C has a substantially triangular cross section and reflects light from the LEDs 22 disposed on the raised portion 41b of the chassis 41 to the side of the diffusion plate 43. The inclined portion 42C, therefore, needs to have a height equal to or higher than the size of the LEDs 22 disposed on the raised portion 41b and preferably has an inclination angle of about 45° with respect to the LEDs 22.

The inclined portion 42C is provided not in one-to-one correspondence with each of the connectors 25 but in a continuous form shared by a plurality of the connectors 25. In the backlight unit 49 shown in FIG. 1, the inclined portion 42C is formed on all of the connectors 25 on the main flat surface, thus being a ridge-shaped protuberance substantially traversing the reflection sheet 42. Furthermore, the cross-sectional shape of the inclined portion 42C is not particularly limited as long as the above-described function can be achieved and may be a dome shape, a substantially trapezoidal shape, or the like.

For example, the inclined portion 42C can be constituted by a cut-and-raised piece formed by making a cut in the reflection sheet and by raising a resulting cut portion of the reflection sheet toward the diffusion plate 43. Specifically, the cut made in the reflection sheet can be of an H-shape, an X-shape, the shape of a straight line, the shape of a curve, or the like. Furthermore, the cut made in the reflection sheet may be of such a shape as to form the cut-and-raised piece in an L-shape, a concave shape, a convex shape, a triangular shape, a quadrangular shape, a claw shape, or the like.

When the LEDs 22 light up, the diffusion plate 43 is irradiated from its rear surface with light outputted from the LEDs 22. Part of the light that does not travel directly toward a direction of the diffusion plate 43 is reflected by the reflection sheet 42 or by the embedded reflection sheet 11 toward the diffusion plate 43. The light is diffused inside the diffusion plate 43, so that, from the outside, the diffusion plate 43 is viewed as being a surface with a relatively uniform luminance.

The LEDs 22 can be configured so that a group of LEDs 22 on each pair of the mounting substrates 21 connected to each other with the connector 25 or all of the LEDs 22 as one unit are electrically connected in series. With this configuration, a current of equal magnitude can be supplied to each of the LEDs 22, and thus the amount of light emitted from each of the LEDs 22 can be made uniform, so that luminance uniformity of the diffusion plate 43 can be improved.

Having the substantially triangular cross section, the inclined portion 42C is unlikely to be deformed. Furthermore, the inclined portion 42C being in the continuous form shared by a plurality of the connectors 25 allows the inclined portion 42C to be formed with efficiency. The inclined portion 42C, however, does not have to be a protuberance long enough to cover the entire length along which all of the connectors 25 are arranged. Instead, a short protuberance may be formed between each pair of adjacent ones of the connectors 25 in the Y direction.

With the inclined portion 42C formed as described above, light from the LEDs 22 disposed on the raised portion 41b of the chassis 41 is reflected off the inclined portion 42C to enter the diffusion plate 43, and thus the luminance in the vicinity of the inclined portion 42C can be increased efficiently. Typically, the luminance is decreased in the vicinity of the connector 25, but by forming the inclined portion 42C on the connectors 25 in the above-described manner, it is possible to compensate for such a difference in luminance from the surroundings.

The foregoing describes an example in which the LEDs 22 are disposed on the sides of the raised portion 41b at both the ends of the chassis 41 in the X direction, and the inclined portion 42C is formed in the Y direction. There are, however, other possible ways of disposing LEDs and an inclined portion, and FIG. 4 shows an example thereof.

Figure 4:
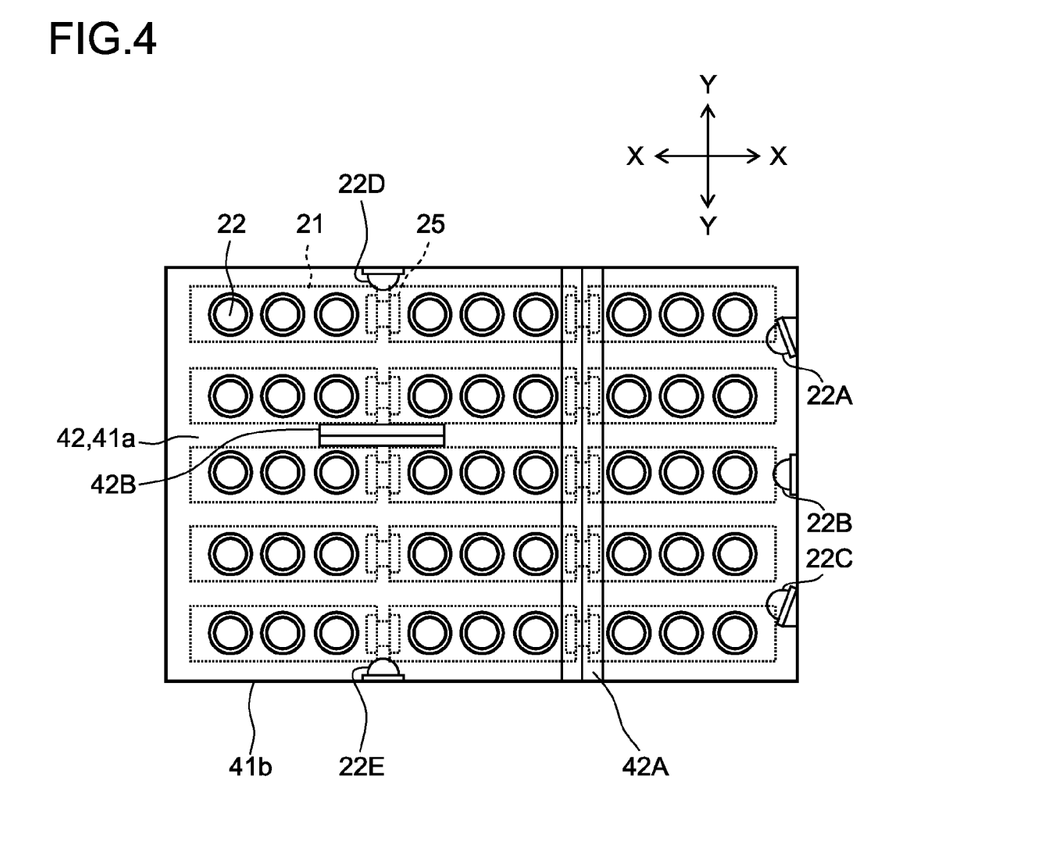
FIG. 4 is a plan view showing a configuration example of the lighting device.

FIG. 4 is a plan view showing a configuration example of the lighting device. On the main flat surface 41a of the chassis 41, three rectangular strip-shaped mounting substrates 21, on each of which three LEDs 22 are disposed along a longitudinal direction, are arranged in series so as to be aligned in the longitudinal direction, and each pair of adjacent ones of the mounting substrates 21 are electrically connected to each other via the connector 25. With respect to a combination of these three mounting substrates 21 as one set, five sets of these are disposed side by side, so that 45 LEDs 22 in total are disposed in a matrix form. LEDs 22A to 22E are disposed on the raised portion 41b of the chassis 41. On the reflection sheet 42, inclined portions 42A and 42B each having a substantially triangular cross section similar to that of the inclined portion 42C are formed. The inclined portion 42A is formed along the Y direction, and the inclined portion 42B is formed along the X direction.

The LEDs 22A to 22C are disposed so as to be directed toward the vicinity of a center portion of the inclined portion 42A (so as to be oriented to a center side of the main flat surface 41a of the chassis 41), and the LEDs 22D and 22E are disposed so as to be directed toward the inclined portion 42B. With this configuration, light from the LEDs 22A to 22C is reflected in the vicinity of the center portion of the inclined portion 42A to enter the diffusion plate 43, and thus the luminance in the vicinity of the center portion of the inclined portion 42A can be increased efficiently. Furthermore, light from the LEDs 22D and 22E is reflected off the inclined portion 42B to enter the diffusion plate 43, and thus the luminance in the vicinity of the inclined portion 42B can be increased efficiently.

Figure 5:
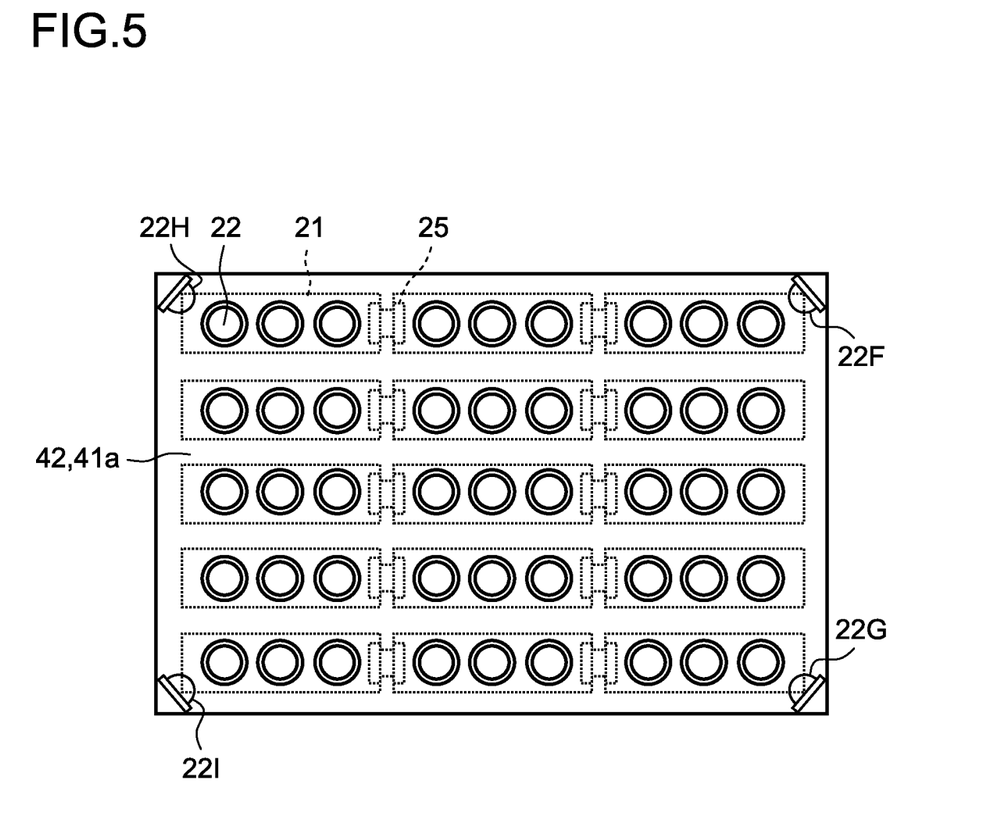
FIG. 5 is a plan view showing a configuration example of the lighting device.

Next, the following describes a technique for, without forming an inclined portion on the reflection sheet 42, achieving an improvement in luminance and efficiently increasing the luminance in a particular region. FIG. 5 is a plan view showing a configuration example of the lighting device, and FIGS. 6A and 6B each show, as one example, a partial sectional view based on FIG. 5.

On the main flat surface 41a of the chassis 41, the LEDs 22 are disposed in a manner similar to that in FIG. 4. At corners of the raised portion 41b of the chassis 41, LEDs 22F to 22I are disposed, respectively. Each of the LEDs 22F to 22I is disposed so as to be inclined obliquely downward as shown in FIG. 6A or so as to be inclined obliquely upward as shown in FIG. 6B.

Figure 6A:
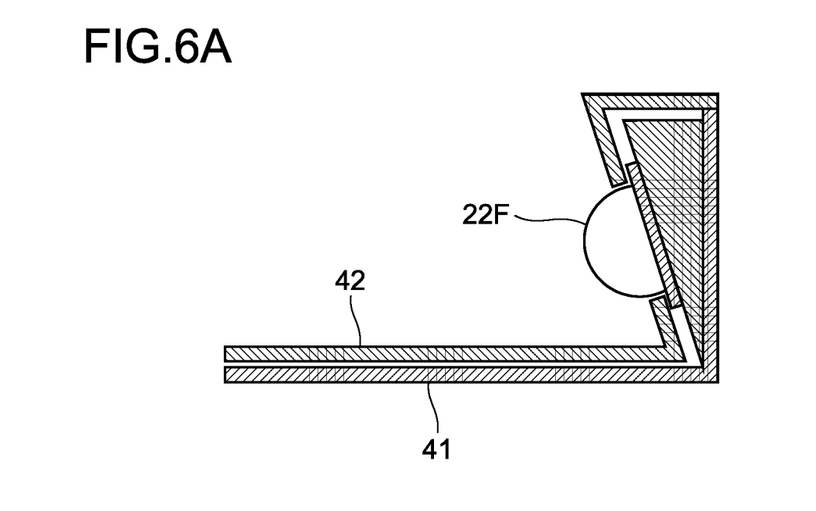
FIG. 6A shows, as one example, a partial sectional view based on FIG. 5.
Figure 6B:
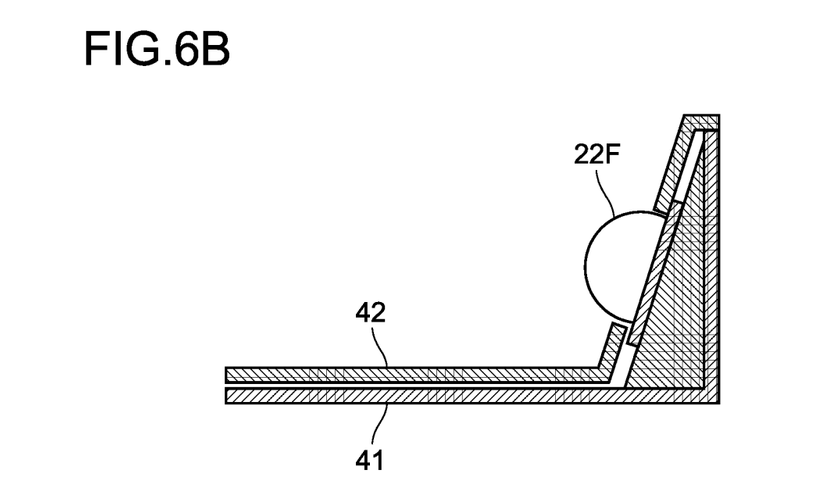
FIG. 6B shows, as one example, a partial sectional view based on FIG. 5.

In a case where the LEDs 22F to 22I are disposed as shown in FIG. 6A, they emit light toward a main flat surface of the reflection sheet 42, and the light is reflected off the reflection sheet 43 to enter the diffusion plate 43. On the other hand, in a case where the LEDs 22F to 22I are disposed as shown in FIG. 6B, they emit light toward the diffusion plate 43, and the light directly enters the diffusion plate 43. With this configuration, the luminance in the vicinity of a position where each of the LEDs 22F to 22I is disposed, i.e. in the vicinity of each corner of the diffusion plate 43 is increased. Typically, the luminance is decreased in the vicinity of each corner of the diffusion plate 43, but by using the LEDs 22F to 22I, it is possible to compensate for such a difference in luminance from the surroundings.

Thus, it is possible to, without forming an inclined portion on the reflection sheet 42, achieve an improvement in luminance and efficiently increase the luminance in the vicinity of the position where each of the LEDs 22F to 22I is disposed.

The effect of being able to increase the luminance in the vicinity of a position where an LED is disposed is obtained not only in a case where the LED is disposed at a corner of the raised portion 41b but also in any case regardless of where the LED is positioned as long as it is disposed on the raised portion 41b.

Figure 7:
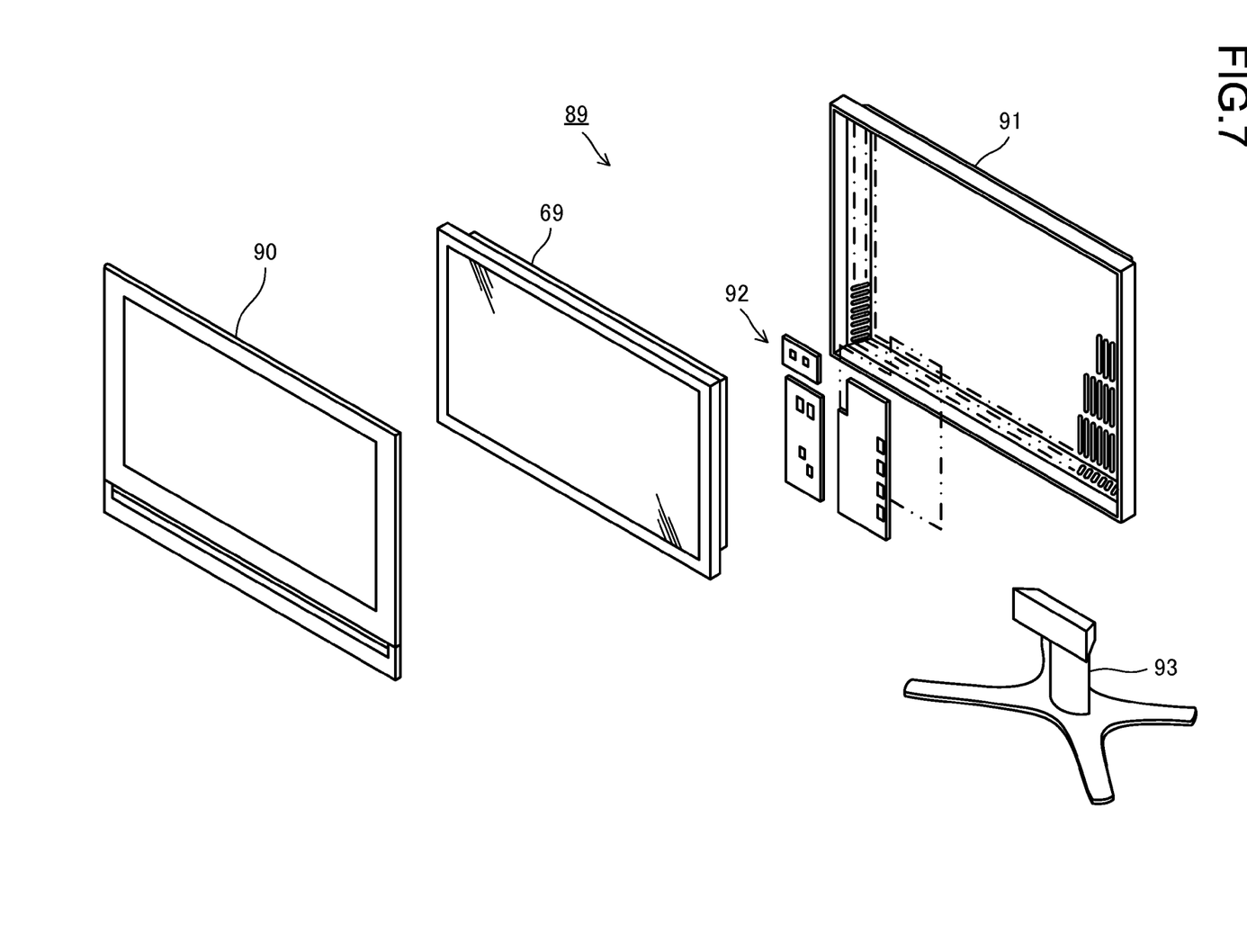
FIG. 7 is an exploded perspective view of a television receiver.

FIG. 7 shows a configuration example of a television receiver into which the display device 69 is incorporated. A television receiver 89 has a configuration in which, in a cabinet formed by joining a front cabinet part 90 and a rear cabinet part 91 together, the display device 69 and a control board group 92 are housed, and the cabinet is supported by a stand 93.

The foregoing has discussed the embodiment of the present invention. The present invention, however, is not limited to the scope described therein and may be effected in variously modified forms without departing from the spirit of the invention.

INDUSTRIAL APPLICABILITY

The present invention can be broadly applied to a lighting device in which a diffusion plate is irradiated with light from a light source. Furthermore, the present invention can be broadly applied also to a display device including the lighting device and to a television receiver including the display device.

LIST OF REFERENCE SYMBOLS 21 mounting substrate
22, 22A to 22I LED
24 diffusion lens
25 connector
41 chassis
41a main flat surface
41b raised portion
42 reflection sheet
42C inclined portion
43 diffusion plate
49 backlight unit
59 liquid crystal display panel
69 display device
89 television receiver
MJ light emitting module

The invention claimed is:

1. A lighting device, comprising:
a diffusion plate;
a chassis that has a raised portion on an outer periphery of a main flat surface thereof and supports the diffusion plate;
a light source that is disposed on each of the main flat surface and the raised portion of the chassis and irradiates the diffusion plate with light; and
a reflection sheet that is disposed on the main flat surface of the chassis and reflects light emitted by the light source toward the diffusion plate; wherein
the light source disposed on the raised portion is disposed so as to be inclined toward the reflection sheet in order to emit light toward the reflection sheet.

2. The lighting device according to claim 1, wherein
the light source disposed on the raised portion is disposed so as to be oriented to a center side of the main flat surface of the chassis in order to focus light to the center side of the main flat surface of the chassis.

3. A lighting device, comprising:
a diffusion plate;
a chassis that has a raised portion on an outer periphery of a main flat surface thereof and supports the diffusion plate;
a light source that is disposed on each of the main flat surface and the raised portion of the chassis and irradiates the diffusion plate with light; and
a reflection sheet that is disposed on the main flat surface of the chassis and reflects light emitted by the light source toward the diffusion plate; wherein
on the reflection sheet, an inclined portion is formed that reflects light emitted by the light source disposed on the raised portion toward the diffusion plate.

4. The lighting device according to claim 3, wherein
the inclined portion has a substantially triangular cross section.

5. The lighting device according to claim 3, wherein
the inclined portion has a dome-shaped cross section.

6. The lighting device according to claim 3, wherein
the inclined portion has a substantially trapezoidal cross section.

7. The lighting device according to claim 3, wherein
a cut-and-raised piece formed by making a cut in the reflection sheet and by raising a resulting cut portion of the reflection sheet toward the diffusion plate constitutes the inclined portion.

8. The lighting device according to claim 7, wherein
the cut made in the reflection sheet is of an H-shape.

9. The lighting device according to claim 7, wherein
the cut made in the reflection sheet is of an X-shape.

10. The lighting device according to claim 7, wherein
the cut made in the reflection sheet is of such a shape as to form the cut-and-raised piece in an L-shape.

11. The lighting device according to claim 7, wherein the cut made in the reflection sheet is of such a shape as to form the cut-and-raised piece in a concave shape.

12. The lighting device according to claim 7, wherein the cut made in the reflection sheet is of such a shape as to form the cut-and-raised piece in a convex shape.

13. The lighting device according to claim 7, wherein the cut made in the reflection sheet is of such a shape as to form the cut-and-raised piece in a triangular shape.

14. The lighting device according to claim 7, wherein the cut made in the reflection sheet is of such a shape as to form the cut-and-raised piece in a quadrangular shape.

15. The lighting device according to claim 7, wherein the cut made in the reflection sheet is of such a shape as to form the cut-and-raised piece in a claw shape.

16. The lighting device according to claim 7, wherein the cut made in the reflection sheet is of a shape of a straight line.

17. The lighting device according to claim 7, wherein the cut made in the reflection sheet is of a shape of a curve.

18. The lighting device according to claim 1, wherein the light source is constituted by a light emitting module including a mounting substrate and a light emitting element disposed on the mounting substrate.

19. The lighting device according to claim 18, wherein a plurality of light emitting elements are disposed side by side on the mounting substrate.

20. The lighting device according to claim 18, wherein the light emitting element is an LED.

21. The lighting device according to claim 20, wherein the LED is obtained by applying a phosphor having a light emission peak in a yellow region to a blue light emitting chip to gain white light.

22. The lighting device according to claim 20, wherein the LED is obtained by applying phosphors having light emission peaks in green and red regions, respectively, to a blue light emitting chip to gain white light.

23. The lighting device according to claim 20, wherein the LED is obtained by applying a phosphor having a light emission peak in a green region to a blue light emitting chip and by using the blue light emitting chip in combination with a red light emitting chip to gain white light.

24. The lighting device according to claim 20, wherein the LED is obtained by using, in combination, light emitting chips of respective colors of blue, green, and red to gain white light.

25. The lighting device according to claim 20, wherein the LED is obtained by using an ultraviolet light chip in combination with a phosphor.

26. The lighting device according to claim 20, wherein the LED is obtained by applying phosphors having light emission peaks in blue, green, and red regions, respectively, to an ultraviolet light chip to gain white light.

27. The lighting device according to claim 18, wherein in the light emitting module, on an opposite side to a side of the chassis, a diffusion lens that diffuses light from the light emitting element is disposed at a position coinciding with the light emitting element when seen in a plan view.

28. The lighting device according to claim 18, wherein a plurality of the mounting substrates are disposed, and each pair of adjacent ones of the mounting substrates are connected to each other with a connector.

29. The lighting device according to claim 28, wherein the mounting substrates are connected to a power source via the connector.

30. A display device, comprising:
the lighting device according to claim 1; and
a display panel that receives light from the lighting device.

31. The display device according to claim 30, wherein the display panel is a liquid crystal display panel.

32. A television receiver comprising the display device according to claim 30.

* * * * *